UNITED STATES PATENT OFFICE.

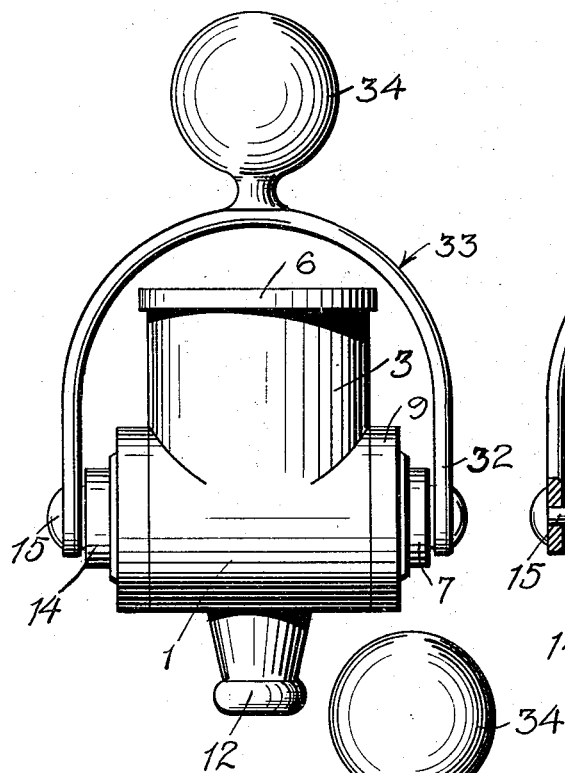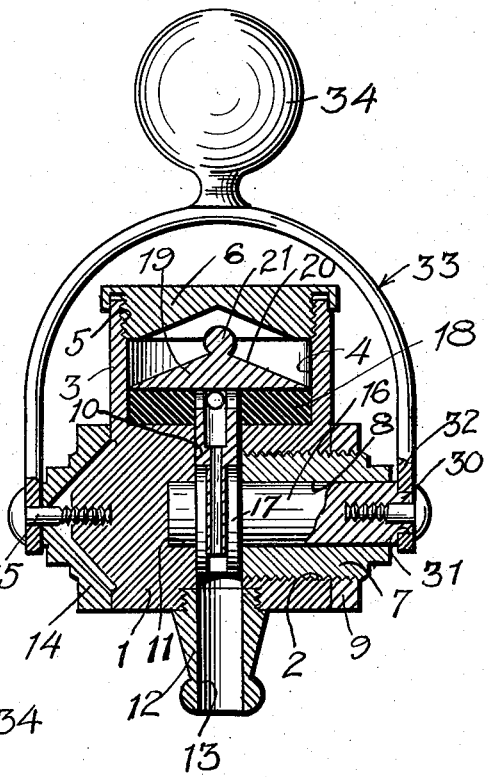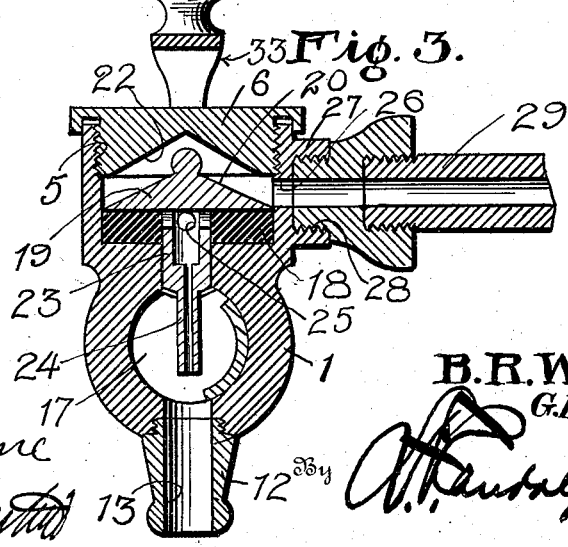

BEATTIE R. WORLEY AND GEORGE H. KELLINGTON, OF DECATUR, ILLINOIS.

DRAFT-ARM FOR SODA-FOUNTAINS.

1,156,736.  Specification of Letters Patent.  Patented Oct. 12, 1915.

Application filed August 31, 1914. Serial No. 859,427.

*To all whom it may concern:*

Be it known that we, BEATTIE R. WORLEY and GEORGE H. KELLINGTON, citizens of the United States, residing at Decatur, in the county of Macon and State of Illinois, have invented certain new and useful Improvements in Draft-Arms for Soda-Fountains; and we do hereby declare the following to be a full, clear, and exact description of the invention, such as will enable others skilled in the art to which it appertains to make and use the same.

This invention relates to new and useful improvements in draft arms for soda fountains, and has for its principal object to provide a device which at all times will remain closed until manually operated.

Another object of the invention is to provide a device which will automatically close to prevent any leakage of the water which passes therethrough.

A still further object of the invention is to provide a simple and effective device which will accomplish the above named objects in the most economical manner.

With these and other objects in view, the invention consists in the combination and arrangement of parts which will be fully set forth in the following specification and in the accompanying drawing, in which:

Figure 1 is a view in elevation of a draft arm constructed in accordance with this invention. Fig. 2 is a transverse sectional view therethrough, illustrating the details of construction, and Fig. 3 is a longitudinal sectional view of the draft arm.

Referring now to the drawings by characters of reference, the numeral 1 designates the body of the device, which is preferably cylindrical and is provided with the internally screw threaded bore 2. A lateral extension 3 is formed on the body, and is provided with the bore 4 provided at its upper terminal with the screw thread 5 with which the externally screw threaded plug 6 is arranged to coöperate. A suitable plug 7 is threaded into the bore 2, and this plug has formed centrally thereof the axial bore 8 the use of which will appear as the description proceeds. A suitable lock nut 9 is arranged to be threaded on plug 2 as illustrated in Fig. 2, and it will thus be seen that the plug 7 will be held against movement. Extending transversely through the body 1 is the transverse bore 10 which communicates with the bore 2 hereinbefore described. A reduced axial bore 11 is formed on the side of the transverse bore opposite the one with which the bore 2 communicates, the use of which will appear as the description proceeds.

Threaded into the body on its under side, is the nozzle 12 having formed centrally thereof the longitudinal aperture 13 which is arranged to communicate with the aperture 10 to permit the liquid to flow therethrough. A suitable washer 14 is removably secured to the end of the body opposite the one in which the bore 2 is formed, and this washer is held in place by means of the screw 15 which is threaded into the body as illustrated in Fig. 2. Rotatable within the bore 8 in the plug 7 is the shaft 16 having formed intermediate its ends the cam 17 which is slotted as illustrated in Figs. 2 and 3 to receive the discharge nozzle of the valve, which will be more fully hereinafter described.

A rubber gasket 18 is secured against the bottom wall of the bore 4, as clearly shown in the drawing, and this gasket is arranged to form a seat for the valve 19 provided with the conical face 20 having at its apex the enlargement 21. The conical face 20 is arranged to coöperate with the inverted conical face 22 of the plug 6 in forcing the valve downwardly while the knob or enlargement 21 limits the upward movement of the valve. It will be noted that the inclination of the conical base 20 will serve so that when the liquid impinges thereon the valve will be gradually forced to its seat and the liquid will be dashed upwardly against the inclined face of the inverted conical portion 22 of the plate 6 against which it impinges and is again directed against the inclined face 20 of the valve. In this way it will be seen that the valve will be forced to its seat. Formed centrally of the under side of the valve 19 is the tubular extension 23 which terminates at its lower terminal in the reduced tubular extension 24 which projects between the sections of the cam 17 as shown in the drawings. A plurality of transverse bores 25 are formed in the tubular member 23 at a point slightly below the lower face of the valve 19, and these apertures are arranged to form outlet openings which will permit the water to flow through the aperture 26 in the body into the nozzle 12 as clearly shown in the drawings. A suitable collar 27 is formed on the body and is internally screw threaded as at 28, and this collar is arranged to form the connection between the water supply and the faucet. The liquid is supplied to the faucet through the pipe 29 and it will be apparent that when the valve is in its closed position pressure will be exerted on the upper face thereof and hold the same closed.

A rectangular extension 30 is formed on the outer end of the shaft 16 and this extension is arranged to project through the rectangular aperture 31 formed in the arm 32 of the U-shaped lever designated generally by the numeral 33, the opposite arm of the U-shaped lever is pivotally secured to the washer by means of the bolt 15 as clearly shown in Fig. 2. A suitable knob or handle 34 is secured to the bight portion of the U-shaped lever, and this knob is arranged to form a handhold by means of which the device is controlled.

It will be apparent from the foregoing, that in use the device is connected to the water supply in the usual way, and upon operation of the lever 33, it will be apparent that the shaft 16 will be rotated, which, in turn will rotate the cam 17 and thereby lift the valve 19 from its seat. This will cause the same to pass upwardly beyond the opening 26 and the liquid will then flow beneath the valve and through the aperture 25 into the nozzle 24, from whence it will flow into the delivery nozzle 12. Upon releasing the handle, it will be apparent, that the liquid pressure against the surface 20 of the valve 19 will force the same downwardly against the seat, and thereby shut off the supply. It will thus be seen, that an automatic means for closing the liquid supply is provided and thereby any leakage of the liquid is prevented. It will also be evident that a tight joint between the valve and its seat is insured, for the reason that the rubber gasket 18 is of sufficient thickness to cushion the reseating of the valve and prevent excessive wear at this point.

While in the foregoing there has been shown and described the preferred embodiment of this invention, it is to be understood that such changes in the combination and arrangement of parts as may fall within the scope of the claims may be resorted to without departing from the spirit and scope of the invention.

Having thus described the invention, what is claimed as new, is:—

1. A draft arm for soda fountains including a cylindrical body, said body having a transverse aperture therethrough and being provided with a longitudinal bore communicating with the aperture, an angular extension on the body, said angular extension being provided with an enlarged bore communicating with the transverse aperture, a cam operatively mounted within the longitudinal bore in the body, a valve slidable in the bore in the angular extension, the upper wall of the valve being conical, a tubular nozzle secured to the valve and arranged to direct the flow of the liquid when the valve is open, the cylindrical extension being provided with an inlet opening, said inlet opening being located at a point slightly above the valve when the same is seated and means controlling the operation of the cam whereby the valve is controlled.

2. A draft arm for soda fountains including a cylindrical body, said cylindrical body being provided with an axial bore and having a transverse bore communicating with the axial bore, a cylindrical extension on the body, said extension projecting laterally therefrom and being provided with an enlarged bore, the lower terminal of the enlarged bore communicating with the transverse bore in the body, a valve slidable in the bore in the cylindrical extension, means within the transverse bore in the body controlling the operation of the valve, and a discharge nozzle formed integral with the valve and projecting downwardly therefrom, said discharge nozzle projecting into the axial bore in the body, the cylindrical extension being provided with an inlet opening at a point slightly above the valve seat, said inlet opening being so positioned that the pressure of the liquid will hold the valve closed.

In testimony whereof we affix our signatures in presence of two witnesses.

BEATTIE R. WORLEY.
GEORGE H. KELLINGTON.

Witnesses:
 I. B. BUSKIRK,
 A. J. WOOD.